United States Patent [19]

Lemelson

[11] E Re. 28,461

[45] Reissued July 1, 1975

[54] TAPE CARTRIDGE AND READER

[76] Inventor: Jerome H. Lemelson, 85 Rector St., Metuchen, N.J. 08840

[22] Filed: May 8, 1974

[21] Appl. No.: 468,132

Related U.S. Patent Documents

Reissue of:

[64] Patent No.: 3,555,245
Issued: Jan. 12, 1971
Appl. No.: 463,097
Filed: June 11, 1965

U.S. Applications:

[60] Continuation-in-part of Ser. No. 152,702, Oct. 17, 1961, abandoned, which is a division of Ser. No. 449,874, July 28, 1954, abandoned, which is a division of Ser. No. 142,748, Aug. 28, 1961.

[52] U.S. Cl...... 235/61.11 R; 226/118; 235/61.1; 242/199

[51. Int. Cl.[2]..... G06K 7/04; B65H 17/42; G11B 15/32

[58] Field of Search ..... 178/111–113; 84/123, 150; 197/19, 20; 226/118, 119, 97; 235/61.11 D, 61.12 R, 61.12 M, 61.11 A, 61.11 R; 360/93, 96; 242/199

[56] References Cited

UNITED STATES PATENTS

| | | | |
|---|---|---|---|
| 1,104,616 | 7/1914 | Brenner | 226/97 X |
| 1,871,232 | 8/1932 | Foster | 242/55.13 |
| 1,953,072 | 4/1934 | Casper | 235/61.115 X |
| 2,209,178 | 7/1940 | Taesler | 242/55.13 |
| 2,216,909 | 10/1940 | Foster | 242/55.13 X |
| 2,218,677 | 10/1940 | Haas | 226/97 X |
| 2,241,231 | 5/1941 | Wittel | 242/55.14 X |
| 2,372,882 | 4/1945 | Daly et al. | 235/61.11 X |
| 2,560,919 | 7/1951 | Bedford | 226/118 X |
| 2,612,566 | 9/1952 | Anderson et al. | 340/174.1 FH |
| 2,617,705 | 11/1952 | Coombs et al. | 340/174.1 FH |
| 2,641,656 | 6/1953 | Dicke | 340/174.1 G |
| 2,667,535 | 1/1954 | Slayton | 235/61.115 |
| 2,782,041 | 2/1957 | Muller | 226/118 X |
| 2,912,179 | 11/1959 | Schuyler | 242/55.134 X |
| 2,919,866 | 1/1960 | Minott | 242/55.13 X |
| 2,965,170 | 12/1960 | Perez et al. | 235/61.1 UX |
| 2,971,716 | 2/1961 | Sampson | 242/55.13 |
| 2,979,244 | 4/1961 | Pouliart et al. | 226/118 |
| 3,009,024 | 11/1961 | Eash | 242/55.134 X |
| 3,016,207 | 1/1962 | Comstock | 226/118 X |
| 3,017,803 | 1/1962 | Sakaki | 242/55.13 X |
| 3,075,717 | 1/1963 | Kingston | 242/55.13 |
| 3,111,282 | 11/1963 | Proctor | 242/55.13 |
| 3,120,781 | 2/1964 | Babcock et al. | 242/55.13 X |
| 3,126,163 | 3/1964 | Knox | 242/55.19 AZ |
| 3,177,768 | 4/1965 | Hallamore | 242/55.13 X |
| 3,187,165 | 6/1965 | Turner et al. | 235/61.115 |
| 3,202,372 | 8/1965 | Reader | 226/118 X |
| 3,251,048 | 5/1966 | Killen | 340/174.1 |

*Primary Examiner*—Daryl W. Cook
*Assistant Examiner*—Robert M. Kilgore

[57] ABSTRACT

A tape cartridge or magazine and reading apparatus therefore are provided wherein tape in the cartridge may be driven past a plurality of transducers supported by a mount for the cartridge when the cartridge is predeterminately located on said mount. The cartridge contains an opening exposing a length of the recording tape to a bank of transducers.

In one form, the transducers comprise a plurality of switches arranged in parallel circuits which are made and broken when perforations in the tape are sensed by the switches. In another form, recordings on the tape are sensed by respective transducers disposed off the tape as it is driven therepast. Suitable tape tensioning means associated with the mount is operative after properly mounting the cartridge to engage and predeterminately provide tension in the tape driven past the bank of transducers.

In another form of the invention recording is effected on the tape and the cartridge by a bank of transducers operative to punch holes in the tape as it is driven therepast.

18 Claims, 15 Drawing Figures

INVENTOR.

Jerome H. Lemelson

INVENTOR.
JEROME H. LEMELSON

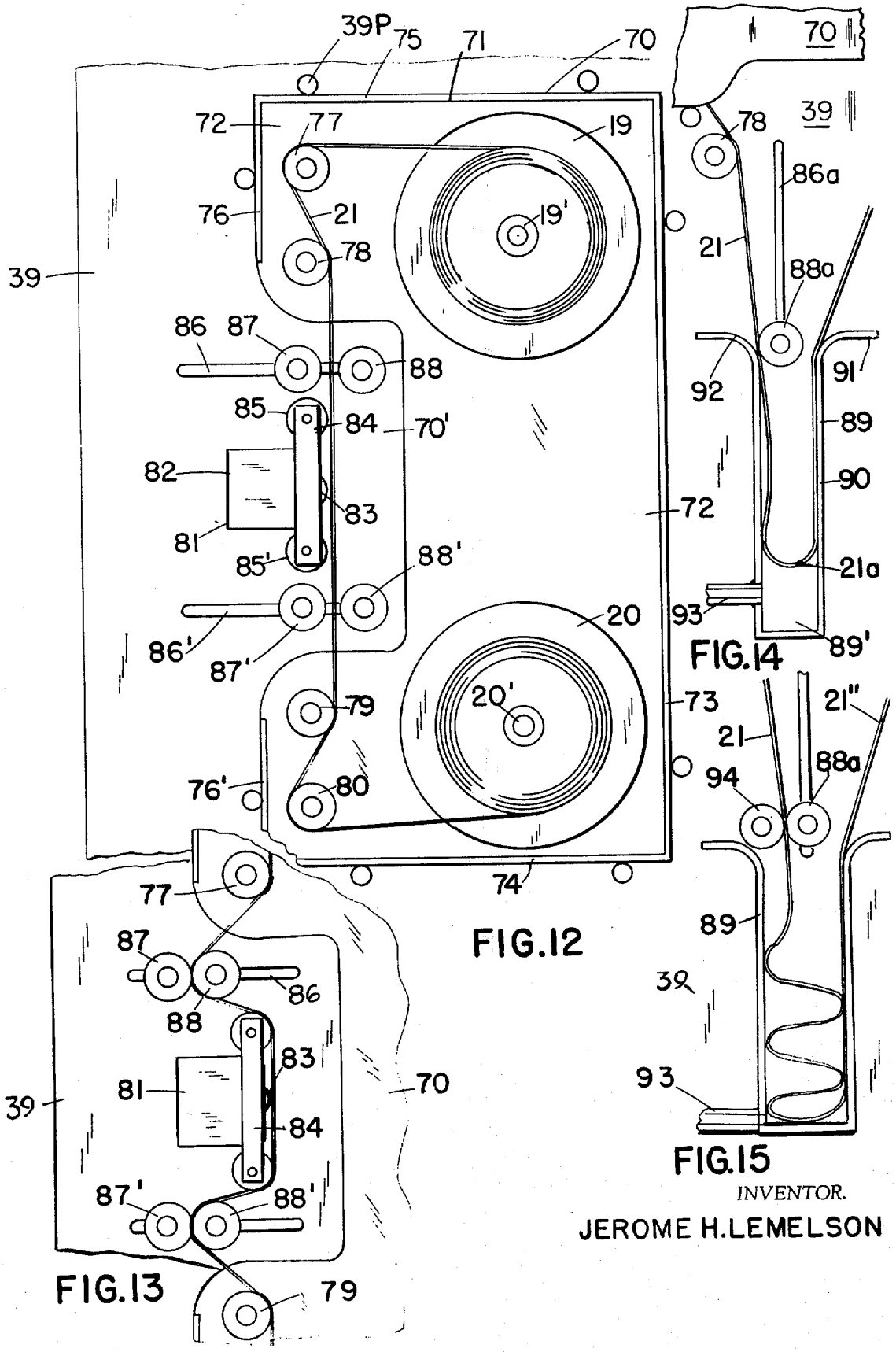
INVENTOR.
JEROME H. LEMELSON

TAPE CARTRIDGE AND READER

Matter enclosed in heavy brackets [ ] appears in the original patent but forms no part of this reissue specification; matter printed in italics indicates the additions made by reissue.

---

This application is a continuation-in-part of my application Ser. No. 152,702 filed Oct. 17, 1961 now abandoned, and entitled Automatic Production Systems which is a division of application Ser. No. 449,874 filed on July 28, 1954, now abandoned, and Ser. No. 142,748 filed Aug. 28, 1961.

The instant invention relates to apparatus for storing and reading information bearing elongated flexible members such as recording tape or film and more particularly to such apparatus including cartridge means for storing and feeding such tape or film which may be readily and easily loaded into printing, reading or computing devices for operative use of the tape.

Numerous applications of tapes necessitate storage thereof for subsequent use. It is typical to enter data through a Flexowriter device which by the selective operation of its typewriter keyboard, simultaneously prepares a paper tape by punching or printing. The prepared paper tape is then ready for use as an input recording to a computer, data processor and the like. Such tapes must be carefully handled to prevent tearing or any damage which may affect feeding of the tape and damage or alteration to the data stored therein. Also data entered into the tape may fall into the categories of program subroutines, permanent lists and the like which will be reused frequently. This necessitates numerous removal and replacements of the tape upon the processing unit.

The instant invention contemplates the use of a tape cartridge which substantially fully encloses the tape and its reversible takeup and feed reels. An access opening is provided for engaging the tape by read (or punch) means when the cartridge is positioned relative to the reading station. Since positioning and/or removal of the cartridge does not require any physical handling whatsoever of the tape, it remains immune from physical strain or damage or other abuse while being removed, replaced, transported, stored or otherwise used.

It is therefore one object of this invention to provide a novel tape transport and apparatus for reading same for use in computers, data processors and the like.

Another object of the instant invention is to provide a novel tape cartridge removably mounted upon a tape reading station, for recording or readout purposes, which tape is immediately accessible to the read or write head assembly and yet is substantially fully enclosed by the cartridge housing to facilitate handling, storage and other use.

These and other objects of this invention will become apparent when reading the accompanying description and drawings in which:

FIG. 11 shows another preferred embodiment in which the switches 36 are each comprised of sensing fingers 37 which are biased toward the tape and will close a circuit (contained within the switch housing) when momentarily entering a hole punched in the tape.

FIG. 12 is a side view of a tape cartridge with a sidewall removed and means for drawing the tape out of the cartridge FIG. 13 is a fragmentary view of the cartridge of FIG. 12 showing operation on the tape of the cartridge.

FIG. 14 is a side view of tape transport apparatus showing modifications to the apparatus of FIG. 12 and FIG. 15 is a side view of tape transport apparatus showing further modifications to the apparatus of FIG. 14.

It can be seen from the foregoing description that the instant invention provides a simple, easy-to-use cartridge for paper tape or other forms of tape which facilitates storage, transportation, use and protection of the tape by provision of a housing which substantially completely surrounds the stored tape and provides simple straightforward operative coupling with either tape readers, printers or computers and peripheral input-output devices.

Figure 1:
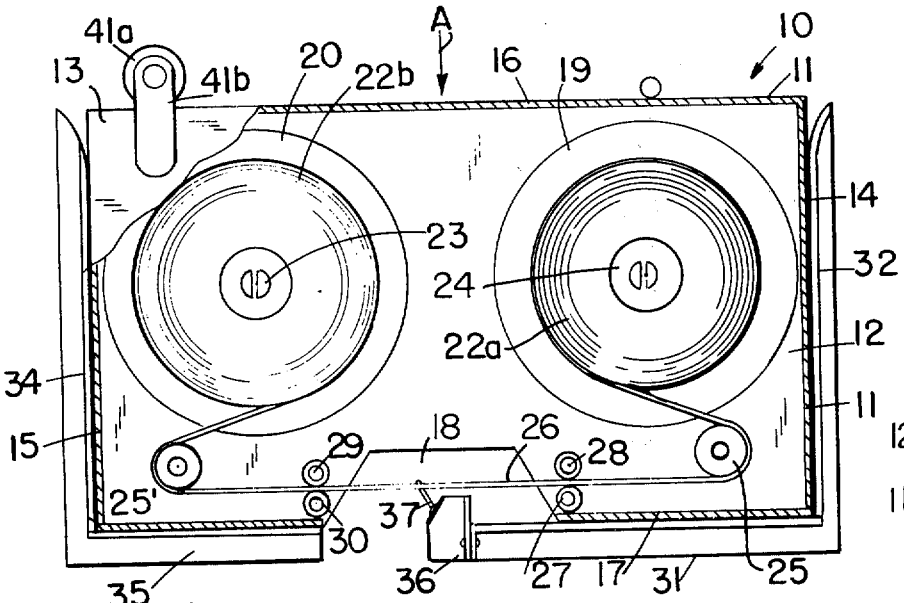
FIG. 1 is a side view of a tape cartridge assembly designed in accordance with the principles of the instant invention and showing the interior components thereof with the front cover being substantially completely removed.

There is shown in FIG. 1 a design for a tape carrying magazine or cartridge 10 and electromechanical reading or sensing means for codes provided on the tape thereof as a plurality of holes in the tape disposed in the form of coded recordings such as binary digital codes. The magaine 10 which is shown with one wall 13 thereof substantially completely removed so as to reveal the internal contents of the magazine, includes a housing 11 of substantially rectangular parallelepiped shape having sidewalls 12 and 13, end walls 14, 15 and front 16 and rear wall 17. The sidewalls 12 and 13 are shaped and fabricated of sheet metal or are molded of plastic to define means for bearingly supporting the shafts 23 and 24 of a plurality of reels 19 and 20 of paper or plastic tape 21. Reel 19 serves as a supply means for said tape and 20 as a takeup means therefor although the tape may be driven in either of two directions by the means described hereafter for activating the code sensing means.

The tape 21 unwinds from reel 19 around a first idler wheel supported in rotation by either or both the sidewalls 12 and 13 of the cartridge and then passes between guides 27 and 28 which may be formed integral of the material of either of said cartridge walls or may comprise small idler wheels supported thereby.

An opening 18 is provided in the end wall 15 of the cartridge housing 11 through which the tape 21 passes permitting access to the tape of the reading device. The tape thereafter passes between guides 29 and 30 which are similar in function to guides 27 and 28, and thence around an idler wheel 25' before returning to the coil 22b of said tape disposed on the takeup reel 20.

Figure 2:
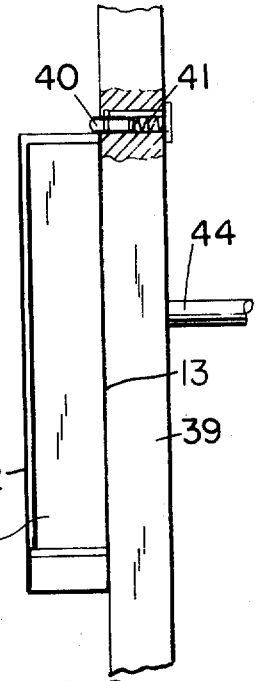
FIG. 2 is an end view of the assembly of FIG. 1 with certain of the parts removed for clarity showing the manner in which the cartridge is maintained in the operative position of the reading station.
Figure 5:
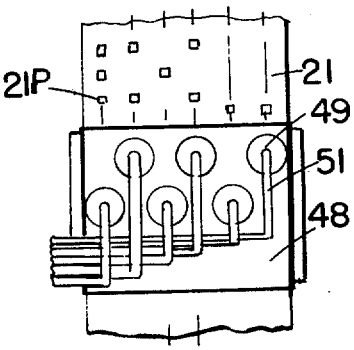

The entire cartridge or magazine assembly 10 is supported on a base 39 (see FIG. 6) such as a housing containing computing circuits or output means adapted to receive signals derived by a bank of transducers supported thereby for reading the tape. The housing or base 39 also contains means for driving a plurality of shafts, one of which 44 is illustrated in FIG. 2, which shafts are operatively removably coupled to the shafts 23 and 24 of the reels for driving the tape from one reel to the other after mounting of the cartridge on the housing or base 39. The base 39 includes guide means for receiving and retaining the cartridge 10 in a predetermined position with respect to a plurality of reading transducers also supported thereby. The guide means in FIG. 1 includes a pair of spaced-apart angular supports 32 and 34 adapted to receive and predeterminately position the cartridge housing 11 with respect to a bank of electromechanical switches 36 which are disposed thereby to position their actuator arms 37 across the tape whereby each actuator arm scans a particular channel or band area of the tape containing punchings or cutouts 21P as shown in FIG. 5. The channel recordings 21P run longitudinally along the tape and parallel to each other and a lateral row of cutouts or markings disposed across the tape may, for example, define a code representing a number, character or word. The actuator arms 37 of the electromechanical switches 36 are adapted to ride in and out of the openings 21P in the tape as the tape is driven therepast and to close and open a circuit as they are so actuated for generating electrical pulses to define binary or other forms of codes recorded on the tape.

Switches 36 are shown mounted at one end of the leg 33 of angular bracket 32 and are positioned thereby to permit their actuator arms 37 to engage the tape 21 and to ride in and out of the holes in each channel of the tape.

Other features of the invention illustrated in FIGS. 1 and 2 include means for locking the cartridge 10 in position. A rotatable arm 41a is mounted at the end of a post 41b secured to base 39. The arm 41a is adpated to be rotated to frictionally engage the wall of the cartridge to retain same predeterminately in position. For removal of the cartridge, the arm 41a is rotated out of the way to clear the cartridge wall. Also shown in FIGS. 1 and 2 is a pin 40 one or more of which are disposed in holes or receptacles 41 associated with base 39. The pins 40 are urged by coil springs in the receptacles 41 to engage the sidewalls of the cartridge, yet may be retracted to permit the cartridge to be removed from the stops by illustrated brackets or pins.

Figure 3:
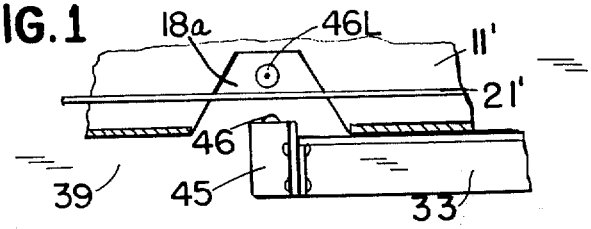
FIG. 3 is a detailed view of alternative reading means to that of FIG. 2.

Whereas in FIG. 1 the recording member 26 is a tape having holes defining codes to be read by deflecting switch arms or permitting electrical contact to be made, in FIG. 3 the tape 21' contains printed or otherwise provided markings on its surface along parallel tracks thereof as codes. A bank 45 of photomultiplier tubes or photoelectric semiconductors 46 is mounted on a bracket 33 secured to the reader housing base 39 with each cell thereof positioned to read a respective channel of the tape. A line light source 46L is removably mounted on the base 39 aligned with the cells 46 in a position such that it will pass through the opening 18a in the housing 11 behind the tape when the cartridge is in operative position on base 39. The light source or lamp 46L may also be automatically retractable to clear the tape if necessary and is used to highlight the markings on the tape or pass light thru the cutouts therein.

Figure 4:
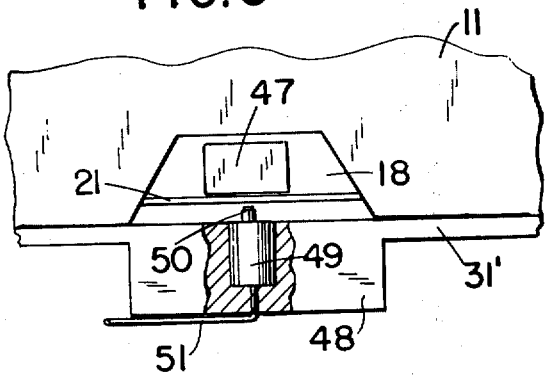
FIGS. 4 and 5 are side in bottom views respectively of a punching means for the tape housed in the cartridge.

In FIG. 4 is shown means for punching holes in a paper or plastic tape 21 while disposed in a magazine 10. While the housing 11 thereof is securely held in a clamp or frame 31'. A plurality of punches or marking tools are shown secured to a block 48 and each comprising a solenoid or fluid cylinder 49 adapted to project a shaft 50 thereof containing a punching die or printing marker adapted to engage the tape when actuated and provide cutouts or markings therein as codes. In other words, the devices 49 are arranged as a bank and each operative to project and retract a respective finger or punch 50 which is aligned with a respective channel or track of the tape. The devices 49 may comprise solenoids, air or hydraulic cylinders or servo motors which are operated by electrical or fluid pulses fed to each on respective input lines 51 which are connected to respective outputs of a code generating means (not shown). The devices 49 may also be replaced by a plurality of wheels operative for marking or providing cutouts in respective tracks of the tape 21, by spark generating electrodes or other suitable means for providing marks or cutouts in the tape.

Notation 47 of FIG. 4 refers to a bucking means in the form of a bar or plate attached either to the walls of the magazine 11 or the base 39 on which mount 48 is supported and positioned so as to be disposed immediately behind the tape 21 in alignment with the projectable elements 50 of devices 49 to support the tape when it is punched or marked on. The device 47 may comprise a rigid bar or projection or a resilient member stationarily mounted or rotatable to cooperate with the projectable member 50 or a printing wheel replacing the marking device 49. Backing means 47 is preferably provided with a plurality of apertures associated and aligned with the projecting punching elements.

In FIG. 5 is shown an arrangement of printing or punching devices 49 which are staggered so as to permit close lateral spacing of the marking elements of each across the tape. Any staggered arrangement of the solenoids or fluid cylinders 49 may be effected provided that the inputs 51 to each are properly energized to provide the proper markings or cutouts 21P across the tape in the form of the desired codes.

Figure 6:
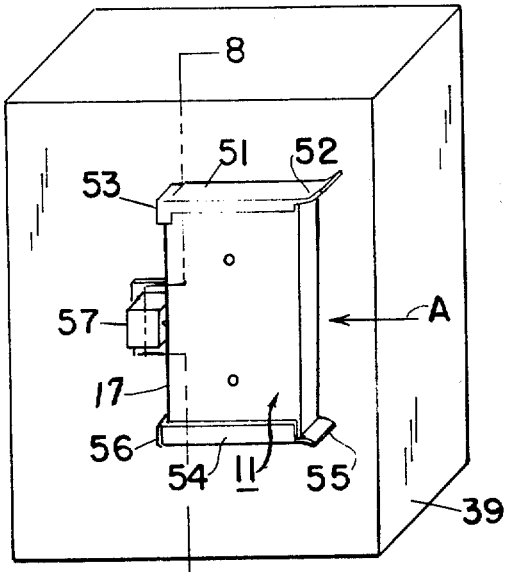
FIGS. 6 and 7 are perspective views showing alternative guide means for removably positioning the cartridge in the operative position.

FIG. 6 illustrates a tape reading apparatus including a housing 39 and means for endwise receiving a tape magazine 11 and prepositioning same with respect to a mount 57 for a bank of reading switches or contact elements of the type illustrated in FIG. 1. The magazine housing 11 is received by a pair of flanged tracks 51 and 54 each of which has flared end portions 52 and 55 and stop end portions 53 and 56 at the other ends thereof for prepositioning the open edge 17 of the housing 11 with respect to the reading bank 57.

Figure 7:
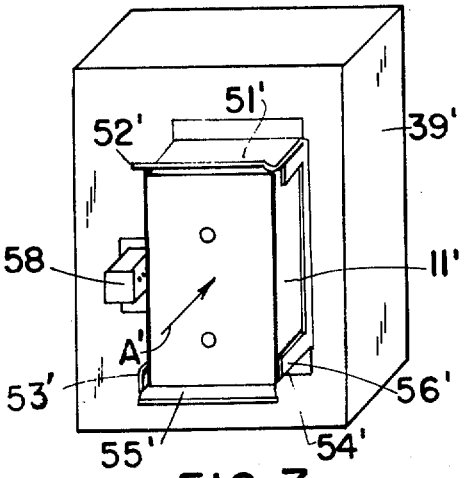

FIG. 7 illustrates a tape reading device including a mount or housing 39' for respective flanged brackets 51' and 54' which are vertically spaced apart to receive a magazine 11' which is moved normal with respect to the sidewall of housing 39' as illustrated by the direction of arrow A'. Flared side portions 52' and 55' of the brackets 51' and 54' facilitate receipt of the housing of 11' and side flanges 53' and 56' of said brackets preposition 11' with respect to a mount 58 for a bank of reading transducers such as photomultiplier tubes or the like.

Figure 8:
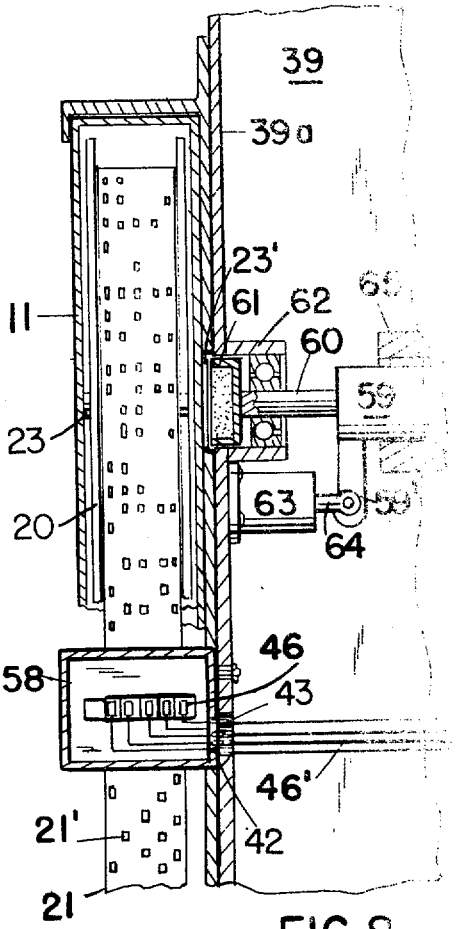
FIG. 8 is a sectional view of FIG. 6 taken along 8—8' showing the means for coupling the driving means to the cartridge takeup and feed reels.

Whereas in the arrangement of FIG. 7 the shafts of the tape reels mounted within the magazine 11' may be pushed to engage the ends of drive shafts of respective servo motors mounted within housing 39' for coupling thereto, the arrangement illustrated in FIG. 6 does not permit simple engagement of the shafts of the tape reels with driving means therefore. Accordingly, in FIG. 8 means are provided for automatically coupling the drive shafts of the servo motors used to drive the reels situated within the tape housing with the shafts of reels after the cartridge is predeterminately located in operative relationship with respect to housing 39. A drive motor 59 is illustrated in FIG. 8 having its housing movable longitudinally within a slide bearing 65 supported by the walls of housing 39. A solenoid 63 is mounted against the front wall 39a of housing 39 and has an actuator arm 64 which engages an extension 59' of the housing for motor 59. Thus, when the arm 64 of the push-pull solenoid 63 is operative to retract, it moves motor 59 and its shaft in a direction to effect coupling of an end fitting 61 mounted on shaft 60 with an end fitting 23' mounted on the shaft 23 of tape reel 20. Thereafter motor 59 may be operative to effect rotation of its shaft 60 in a bearing supported in a housing 62 secured to wall 39a for rotating the reel 20 and driving the tape past the housing 58 for the bank of tape reading transducers 46 supported thereby.

Figure 9:
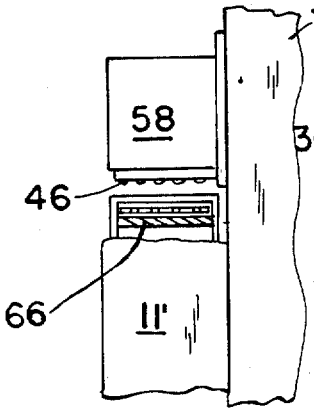

FIG. 9 shows an end view of the arrangement of FIG. 4 wherein the projecting die-punch members 50 are arranged to pierce tape 21 and at least partially enter the openings provided in backing plate 66.

Figure 10:
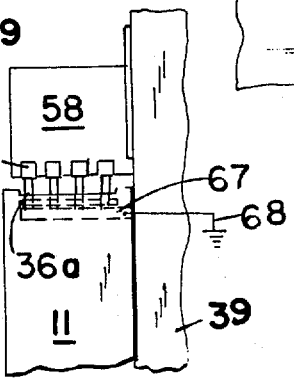

FIG. 10 shows an alternative arrangement for reading information into tape 21 in electrostatic fashion. A backing plate 67 immediately beneath tape 21 is electrically grounded at 68. The support housing 58 is provided with a plurality of electrodes 36 which are selectively pulsed with a relatively high voltage signal creating a spark across the relatively small gap between electrodes 36 and grounded plate 67. In a modified form of the device of FIG. 10, it may similarly be used for reading recording on the tape 21 by employing flexible sensing fingers which bear against tape 21 and, by momentarily protruding through associated punches in tape 21, complete an electrical circuit indicative of one binary state.

Figure 11:
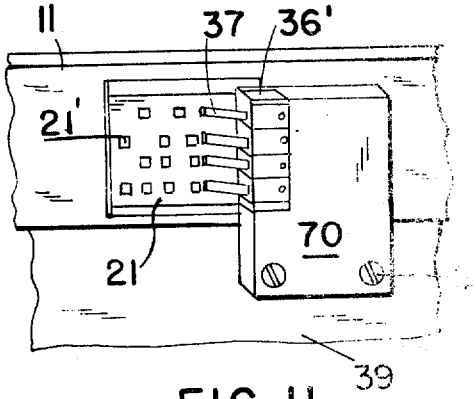
FIGS. 9 to 11 are side, side and perspective views, respectively, of alternative embodiments for reading the data bearing tape within the cartridge.

FIG. 11 shows another preferred embodiment in which the switches 36' are each comprised of a sensing finger 37 which is biased toward the tape and will close a circuit (contained within the switch housing) when momentarily entering a hole punched in the tape.

FIGS. 12 and 13 illustrate a modified form of the invention in which a tape cartridge or magazine of the type described is removably securable against a wall of a housing of a reader or scanner 39 for the tape in the cartridge and means associated with the reader housing are operative thereafter for engaging the tape in order to drive same and/or control tension in the tape as it is driven and, in a preferred form of the invention, when the direction of movement of the tape is reversed.

Conventional tape transport devices which require manual threading of tape, include means for longitudinally pulling the tape during its acceleration and/or reverse movement of the tape so as to maintain a constant tension on the tape and prevent the tape from slackening in a manner which would prevent it from being properly read. Slack may be taken up during the longitudinal movement of the tape by engaging the tape and displacing it normal or oblique to the longitudinal movement of the tape, the displacement being controllable by preset means or means responsive to an electrical signal generated when a sensing means senses the relaxation of tension in the tape.

In FIG. 12, the tape cartridge 70 is shown predeterminately positioned on the tape transport or reader housing 39 by the means hereinbefore described with the shafts 19' and 20' of the reels 19 and 20 coupled to the drive shaft means associated with the reader 39 as described. The tape magazine 70 includes a housing 71 having sidewalls, one of which 72 is shown while the other is removed in FIG. 12 so as to reveal the contents of the housing. Lower and upper end walls 74, 75, and a rear wall 73 join said side walls and the front wall of the housing is defined by wall portions 76 and 76' which extend only a short distance from the upper and lower walls so as to define an opening to the housing 71 through which the tape 21 may be moved as illustrated in FIG. 13.

When the magazine 70 is first positioned against the sidewall of housing 39 by the positioning pins 39P or the means hereinbefore described, the portion of tape 21 passing through the open portion 70' of the housing which is defined by recesses in the sidewalls of the housing, is positioned, as shown, off the bank of transducers 83 and between respective pairs of rollers designated by notations 87, 88 and 87', 88'. The pairs of rollers 87, 88 and 87', 88' are automatically operative thereafter whereby at least one roller in each pair moves normal to the tape to engage same against the other roller for longitudinally driving said tape and/or moving the tape in a manner to take up the slack thereof in response to the variations in the tension in the tape and/or acceleration or reverse drive of the tape.

The tape 21 is shown feeding from periphery of the coil formation thereof provided on reel 19 to a first idler 77 and then around the inside of a second idler 78 which is disposed closer to the opening than 77 and around which the tape may be drawn by the movement of roller 88 in a direction outwardly from the magazine housing 71 as shown, for example, in FIG. 13. Supported by the housing 82 of the transducer assembly 81 is a bar 84 which rotationally supports a pair of free wheeling rollers 85 and 85' at the ends thereof which guide the tape 21 in movement past the transducer head bank 83 while the tape is drawn out of the recess portion 70' of the housing 70 as illustrated in FIG. 13. The movement of rollers 88 and 88', which may be capstans or depressor rolls, outwardly from the housing 70 as illustrated in FIG. 13 may be operative to drawn the tape against rolls 85 and 85' and preposition same with respect to the transducer bank 83 as illustrated in FIG. 13 for operatively coupling the tape and the transducers thereof for performing the functions of reading and/or recording on the tape and predeterminately positioning the tape in operative relation to the transducers of bank 83.

Rollers 87, 88 and 87', 88' are supported on respective shafts, at least two of which are driven by respective drive motors or are free wheeling depending on the mode of tape drive to be employed. The shafts of each pair of rollers are guided in respective paths substantially normal to the surface of the tape defined by slotted openings 86 and 86' in the sidewall of housing 39 which extend a sufficient degree away from the housing 71 to permit the tape to be drawn a predetermined degree out of the housing as illustrated in FIG. 13.

When reading or recording on the tape has been terminated and it is desired to replace the magazine 70 with another magazine, the rollers 87, 88 and 87', 88' are driven by servo motor operated means (not shown) or spring returned to the positions illustrated in FIG. 12 while the servo driving reels 19 and 20 are operated to either return all of the tape to the supply reel or to merely take up the slack in the tape so that it assumes the attitude illustrated in FIG. 12 and clears heads 83 as well as the rollers 87, 88 and 87', 88' permitting the magazine to be removed from the housing 39 without damage to the tape.

The transducer or bank of transducers 83 may comprise any suitable means for reading or recording on the tape such as those described or other means such as magnetic recording and/or reproduction heads, assuming that the tape 21 is magnetic recording tape.

Two other means for controlling tape tension or eliminating the difficulties encountered by slackened portions of the tape are illustrated in FIGS. 14 and 15. In FIG. 14 the tape 21 has been driven out of the magazine housing 71 by a powered roller 88a which is operatively connected to a servo motor and means for moving the shaft thereof along a slotted hole 86a in the sidewall of the tape reader housing 39. Powered roller 88a moves the tape 21 into alignment with the open end of a subhousing 89 which defines a long column, the lower end of which is connected to a vacuum pump to reduce the pressure therein for the purpose of maintaining tension on a looped portion of the tape defined in FIG. 14 by the notation 21a. The sidewall 90 of column 89 has a width substantially equal to the width of the tape so that when air is drawn from the lower end 89' of column 89 by connecting a vacuum pump to a tube 93 coupled thereto, the tape loop 21a will be drawn into the column and maintained therein under constant tension even if it is in motion along the path defined by the various tape guide means associated with the magazine and the reader housing 39. Wheel 88a may be merely operative to position the tape 21 in alignment with the open end of the housing of column 89 whereafter the tape may be drawn by air pressure into the housing or the wheel 88a may be operative to rotate upon aligning the tape with the open end of the column 89 so as to drive same into said column as shown after which the wheel 88a may be retracted to permit the movement of the tape without interference thereby. Notations 91 and 92 refer to the rounded upper ends of the wall 90 of the column 89 to permit the tape to be driven thereover without excessive wear on the tape with the tape blocking off volume 89' of column 89.

FIG. 15 illustrates a modified form of the invention in which wheel 88a draws the tape immediately above the open end of column housing 89 against an idler wheel 94 which cooperates with 88a in driving a portion of the tape into the column 89. In FIG. 15 the column 89 is shown as receiving looped portions of the tape to provide substantial slack within the column when operated without applying suction to the bottom of the column so that the downstream portion 21' of the tape may be driven from the slack portion thereof situated within the housing 89.

Variations in the tape magazines and the transducer and transport means hereinbefore described are noted as follows.

The multiple feed and takeup reels for the tape may be replaced by an endless loop of tape and means for maintaining same in a spiral coil formation within the magazine housing whereby the tape slack takeup or drive means described or modifications thereof may be provided to operate on the tape as described.

It is also noted that certain of the features of the invention illustrated in FIGS. 12–15 may be applied to the embodiments illustrated in the FIGS. 1–8 for reading and/or recording on tape mounted on a magazine or cartridge.

Various forms of recording and scanning may be employed by using the proper transducers cooperating with the tape by the means described. For example, signals may be magnetically recorded and reproduced from steel or plastic tape containing magnetic oxide, thermoplastic recording means such as one or more electron guns generating beams for scanning the predeterminately positioned tape and optical scanning means may also be utilized. The recording transducers may also comprise reciprocating printing means and/or rotary printing wheels selectively operable to engage the tape as it is driven.

The described rollers operative to engage and draw the loop of tape out of the cartridge may be replaced by other means such as fingers, suction devices or the like operative to engage and hold the tape and to move along slotted guides as described or on pivoted and/or lineally actuated arms.

Automatic means for loading and unloading tape cartridges on the reader may be provided.

Also, banks of side-by-side arrayed cartridges as described may be serviced by a single bank of recording and/or reproduction transducers in one or more of the forms as described wherein the arrayed cartridges are selectively movable to position a selected cartridge in operative relation with said bank of transducers or the means mounting the bank of transducers is selectively movable to bring said transducers into operative relation with a selected cartridge to perform the described recording or reproduction functions with respect to selected portions of the selected tape. Reference is made to my pending application Ser. No. 142,748 for details of such transducer-cartridge arrangements involving lineal or rotary motion of the cartridges and/or transducers.

Improvements and modifications to the banks or reading transducers described are noted and are illustrated in FIGS. 8 and 11. In FIG. 8, the mount 58 for the photoelectric reading transducers is shown as being pluggable and connectable against the sidewall 39a of the reader housing 39 to permit quick replacement thereof. Wire pairs extending from the reading transducers 46 mounted in 58 are shown connected to male connector plugs 42 mounted on the wall of the housing 58 which engages the wall 39a. Plugs 42 engages female receptacles 43 mounted on wall 39a each of which receptacles is connected to a respective wire of a bundle 46' thereof which extends to the output or computing circuits of the reader device 39. Screws or quick-connect fasteners (not shown) may be used to fastening subhousing 58 to the main housing so that it may be easily removed and replaced if necessary.

In FIG. 11, the bank 36' of switches or feeler contact arms 37 is shown secured to a mount 70 which is removably secured to housing 39 with screws S. Pluggable leads extending from the transducers of bank 36' such as illustrated in FIG. 8 may also be employed in the arrangement of FIG. 11 to permit quick disconnection and replacement of the bank of transducers or switches.

I claim:

1. Tape transducing apparatus comprising in combination with a cartridge containing recording tape and means therein for supplying and taking up tape, an opening in said cartridge, means for guiding said tape past said opening, a support for said cartridge including tape transducing means and means operative to longitudinally drive said tape past said transducing means, tape engaging means operative after mounting said cartridge on said support for engaging the portion of the tape extending across the opening therein and drawing said portion away from said cartridge, a tape tensioning means mounted on said support, means moving said tape engaging means to carry tape engaged thereby into alignment with said tape tensioning means to couple said tape and said tape tensioning means, means for driving said tape in a path defined in part by said tape tensioning means and operating said tensioning means to control the tension of said tape.

2. Apparatus in accordance with claim 1 wherein said tape tensioning means includes a vacuum chamber having an opening for receiving said tape, means applying vacuum to said chamber to cause a loop portion of said tape carried by said tape engaging means to be drawn into said chamber, said chamber being shaped to define a sliding seal with the edges of the loop of tape disposed therein while permitting the longitudinal movement of said tape through said chamber under tension defined by said vacuum in said column.

3. Tape transducing apparatus comprising in combination with a cartridge containing recording tape and means therein for supplying and taking up tape, an opening in said cartridge, means for guiding said tape past said opening, a support for said cartridge including tape transducing means and means operative to longitudinally drive said tape past said transducing means, tape engaging means operative after mounting said cartridge on said support for engaging the portion of the tape extending across the opening therein and drawing said portion away from said cartridge, and a tape slack chamber having an opening for receiving tape mounted on said support, said tape engaging means including a first wheel operative to engage the rear face of said tape and second wheel means disposed in alignment with said chamber opening, means for moving said wheel into alignment with said tape slack chamber and engaging said tape between said first and second wheels, and means operative to rotate one of said wheels for driving a quantity of said tape into said chamber to serve as a slack portion from which may be drawn tape when said tape is longitudinally driven past said transducing means.

4. A tape storage and transducing assembly comprising:

a tape cartridge including a housing having substantially parallel sidewalls and end walls joined to said sidewalls, an opening in an end wall of said housing;

supply and takeup means within said housing for multichannel tape;

means for guiding and moving said tape longitudinally past said opening;

a support for said cartridge having means for removably holding and operatively positioning said housing on a sidewall of said support;

guide means for guiding said cartridge in a direction normal to said sidewall of said support;

drive means secured to said support and operative to become coupled to drive said tape when said cartridge is operatively positioned on said support;

a plurality of transducers, a mount for supporting said transducers in a bank in side-by-side relationship on said sidewall of said support;

said mount positioning said transducers to permit sliding engagement of the tape and transducers during movement of said cartridge normal to said surface to an operative position on said support.

5. A tape storage and transducing assembly comprising:

a tape cartridge including a housing having substantially parallel sidewalls and end walls joined to said sidewalls, an opening in an end wall of said housing; supply and takeup means within said housing for multichannel tape, means for guiding and moving said tape longitudinally past said opening, a support for said cartridge having means for removably holding and operatively positioning said housing on a sidewall of said support, guide means for guiding said cartridge in a direction parallel to said common surface of said support in movement of said cartridge towards its operative position;

drive means secured to said support and operative to become coupled to drive said tape when said cartridge is operatively positioned on said support;

a plurality of transducers, a mount for supporting said transducers as a bank in side-by-side relationship on said sidewall of said support and positioning said transducers to permit sliding engagement of the tape and the transducers with the tape being tensionally drawn against the transducers when said tape cartridge is in said operative position.

6. A tape storage and transducing assembly in accordance with claim 5, including a rotary mount for said tape in said cartridge having a hub accessible to said sidewall of said support when said cartridge is in the operative position on said support, said drive means including a rotatable shaft and means for rotating said shaft, means for moving said shaft from a retracted position whereby said shaft is out of the way of said cartridge and permits the sliding movement of a cartridge along said guide means into operative relationship with said transducers, to a projected position whereby engagement is made between said drive means and said hub to permit powered rotation of the hub and the driving of said tape in said cartridge by said drive means.

7. A tape storage and transducing assembly comprising:

a tape cartridge including a housing having substantially parallel sidewalls and end walls joined to said sidewalls;

an opening in said end wall of said housing;

supply and takeup means within said housing for a multichannel tape;

means for guiding and moving said tape longitudinally past said opening;

a support for said cartridge having means for removably holding and operatively positioning said cartridge on a sidewall of said support;

drive means secured to said support and operative to become coupled to drive said tape when said cartridge is operatively positioned on said support;

a plurality of punches, means for supporting said punches in side-by-side relationship on said support in positions to permit each punch to engage a separate channel of said multicircuit channel tape for recording data in the form of holes punched in said tape; and a backing plate positioned adjacent the rear surface of said tape in alignment with said opening in said cartridge to cooperate with said punches and facilitate the punching of said tape when said cartridge is operatively positioned on said support.

8. A tape storage and transducing assembly comprising:

a tape cartridge having a housing having sidewalls and end walls joined to said sidewalls;

an opening in an end wall of said housing;

supply and takeup means within said housing for flexible recording tape;

means for guiding and moving said tape longitudinally past said opening;

a base for supporting said cartridge including means for removably holding and operatively positioning said cartridge on said base;

drive means secured to said base and operative to become coupled to drive said tape when said cartridge is operatively positioned on said base;

transducing means mounted on said support and located so as to be out of coupling relationship with the tape disposed adjacent the opening in said housing when said cartridge is operatively held on said base; and means supported by said base, for engaging the portion of said tape extending across said opening in said cartridge and withdrawing said tape outwardly from said cartridge housing into engagement with said transducing means to operatively couple the tape with the transducing means.

9. An assembly in accordance with claim 8, said means for engaging said portion of said tape extending across said opening comprising a plurality of reciprocally mounted roller members supported by said cartridge support, and means for moving said roller members in a direction to permit said roller members to engage said tape and maintain said tape taut by drawing and taking up slack in the tape.

10. An assembly in accordance with claim 8, said means supported by said cartridge base for engaging said portion of said tape extending across said opening in said cartridge wall being operative to engage spaced-apart portions of said tape and drawn a portion of said tape out of said housing while other portions of said tape in said housing remain connected to said tape supply and takeup means.

11. A tape storage and transducing assembly comprising:

a tape cartridge having a housing with sidewalls and end walls joined to said sidewalls;

an opening in an end wall of said housing, supply and takeup means for a flexible record tape having a plurality of record tracks extending parallel to each other and to the longitudinal axis of the tape and each provided with code recordings composed of spaced apart holes cut in the tape;

means for guiding and moving said tape longitudinally past said opening;

a support for said cartridge having means for removably holding and predeterminately positioning said housing on a sidewall of said support;

drive means secured to said support and operative to become coupled to drive said tape when said cartridge is operatively positioned on said support;

a plurality of transducers;

a mount for supporting said transducers in side-by-side relationship opposite the opening in said end wall of said cartridge when the cartridge is predeterminately positioned by said holding means on said support;

each of said transducers comprising a separate switch having a respective spring biased switch arm protruding outwardly from the switch a degree such that when said cartridge is predeterminately positioned by said holding means on said support, said switch arms will each be compressed against the surface of the tape and will operatively project through the holes in the tape as the tape is driven therepast so as to effect the making and breaking of the circuits associated with each switch to thereby generate information in the form of electrical codes.

12. A tape storage and transducing assembly comprising:

a tape cartridge having a housing with sidewalls and end walls joined to said sidewalls;

an opening in an end wall of said housing;

an opening in a sidewall of said housing adjacent said end wall opening;

supply and takeup means for a flexible record tape having a plurality of record tracks extending parallel to each other and to the longitudinal axis of the tape and each provided with code recordings composed of spaced apart holes cut in the tape;

means for guiding and moving said tape longitudinally past said opening in said end wall of said housing;

a support for said cartridge having means for removably holding and predeterminately positioning said housing on a sidewall of said support;

drive means secured to said support and operative to become coupled to drive said tape when said cartridge is operatively positioned on said support;

a plurality of transducers;

a mount for supporting said transducers in side-by-side relationship in alignment with the opening in the end wall of said cartridge when the cartridge is predeterminately positioned by said holding means on said support;

each of said transducers comprising a separate photoelectric cell located on said mount so as to become aligned with a separate track of the tape when the cartridge is predeterminately positioned by said holding means on said support;

a light source located on said base such that it will pass through said opening in the sidewall of said cartridge when the cartridge is predeterminately positioned on said support by said holding means and will be positioned behind said tape so as to pass light through the openings in said tape as they become aligned with said light source and respective of said photoelectric cells for energizing and deenergizing said photoelectric cells as the tape is driven past the opening.

*13. A tape storage and transducing assembly in accordance with claim 8 including additional means comprising auxiliary guide means for said tape supported by said base for guiding said tape in its movement towards and away from said transducing means.*

*14. A tape storage and transducing assembly in accordance with claim 13 wherein said auxiliary guide means comprises a plurality of separate guide members other than said means for engaging said portion of said tape extending across said opening in said cartridge and withdrawing said tape outwardly from said cartridge.*

*15. A tape storage and transducing assembly in accordance with claim 14 wherein said auxiliary guide means are disposed along said path of movement of said tape past said transducing means in advance of said transducing means and beyond said transducing means to respectively receive and guide tape in movement towards and against said transducing means and in movement from said transducing means in a path back into said cartridge housing.*

*16. A tape storage and transducing assembly in accordance with claim 13 wherein said auxiliary guide means comprises at least two rollers which are rotationally supported by said base and are each adapted to receive and guide tape drawn by said means for withdrawing said tape from said cartridge housing.*

*17. A tape storage and transducing assembly in accordance with claim 14 wherein said means for engaging a portion of said tape extending across said opening in said cartridge housing comprises a power operated tape engaging means movable from a position behind said tape extending across said opening in said cartridge housing into engagement with the rear face of said tape and then in a path to predeterminately draw said tape into engagement with both said auxiliary guide means and said transducing means.*

*18. A tape storage and transducing assembly in accordance with claim 17 including a power rotated capstan supported by said base, said tape engaging means being operable to urge said tape against said capstan when said tape is drawn thereby against said transducing means to permit said capstan to drive said tape longitudinally past said transducing means.*

* * * * *